Feb. 14, 1928.

J. F. DOTZAUER

DUCT GRAPPLE

Filed Jan. 22, 1926

1,658,887

INVENTOR
J.F. Dotzauer
BY
ATTORNEY

Patented Feb. 14, 1928.

1,658,887

UNITED STATES PATENT OFFICE.

JOHN F. DOTZAUER, OF NEWARK, NEW JERSEY, ASSIGNOR TO AMERICAN TELEPHONE AND TELEGRAPH COMPANY, A CORPORATION OF NEW YORK.

DUCT GRAPPLE.

Application filed January 22, 1926. Serial No. 83,096.

This invention relates to couplings or grapples, and more particularly to devices of this character which are used in connection with the placing of cables in underground ducts or conduits.

In placing cable in underground ducts, it is first necessary to run the pulling-in line from one manhole to the next. This is done by means of short rods known as duct rods which are coupled together and pushed through the duct to make a continuous rod from manhole to manhole, and by means of these rods, the pulling-in like is drawn through the duct. Where the manholes are spaced a considerable distance apart, it is difficult to push the rods all the way from one manhole to the next, and under these conditions, it is customary to rod the duct from each manhole, the rods from each direction meeting near the middle of the run. In such cases, some device must be employed which will couple and hold the rods together when they meet.

Accordingly, it is an object of the present invention to provide a simple and inexpensive device of the above character which will couple and hold the ends of the duct rods together at their meeting point in a secure and effective manner. Other and further objects of the invention will hereinafter appear.

The nature of this invention will more fully appear from the following description when considered in connection with the accompanying drawing, in which one embodiment thereof is illustrated.

Figure 1:
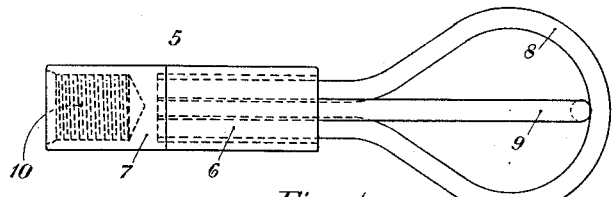
Figure 3:
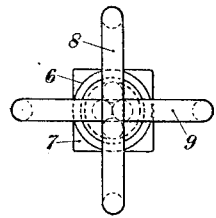
Figure 4:
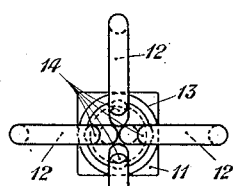
Figure 2:
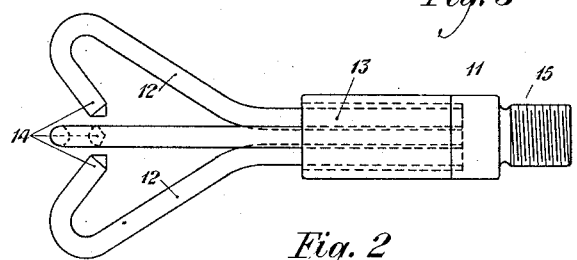
Figure 5:
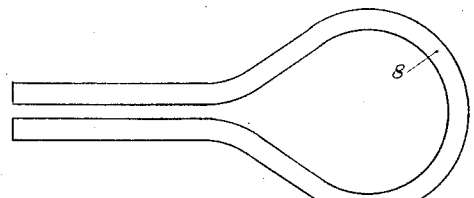
Figure 6:
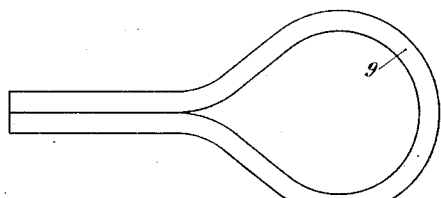
Figure 7:
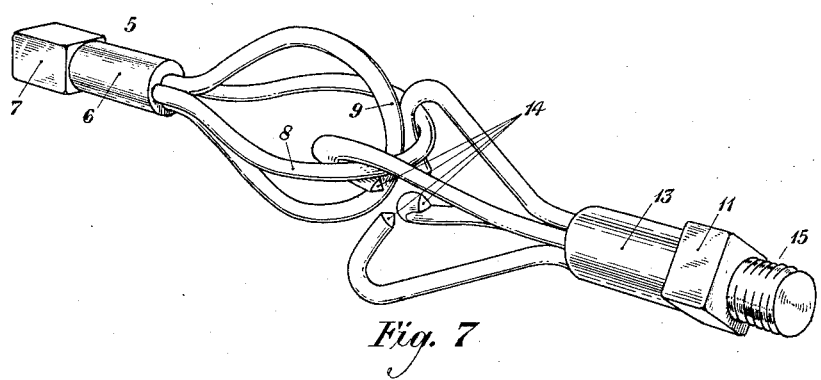

Referring to the drawing, Figure 1 is a side elevation of the loop portion of the grapple; Fig. 2 is a side elevation of the other or hook portion of said grapple; Figs. 3 and 4 are end views of Figs. 1 and 2, respectively; Figs. 5 and 6 represent details of Fig. 1, and Fig. 7 is a perspective view showing the loop and hook portions of said grapple in locked engagement.

The improved arrangement and its connections may be made of iron, steel or other suitable metal.

Referring to the drawing, the numeral 5 represents a socket of the loop portion of the grapple illustrated in Fig. 1. This socket may comprise a cylindrical portion 6 and an integral rectangular socket portion 7. A ring portion, comprising loops of wire 8 and 9, which may be of any desired size to provide suitable ruggedness, is securely positioned within the cylindrical portion 6 in some such manner as by brazing them together and to the cylindrical chamber. The loop 8 in the present instance is shown as having its ends separated, while the ends of the loop 9 are placed together. The latter loop is turned so that its ring portion lies in a plane at substantially right angles to the ring portion of the loop 8. The placed-together ends of the loop 9 are positioned within the separated ends of the loop 8, and the outer rounded top portion of the loop 9 rests firmly against the inner circular top portion of the loop 8. The rectangular socket portion 7 is provided with an interior threaded chamber 10 in which the threaded end of a duct rod (not shown) registers, so that the portion 5 of the grapple may be pushed along the duct or conduit by a line of duct rods.

The hook portion of the grapple, as more clearly appears in Fig. 2, may comprise a socket 11 which may be similar to the socket 5 indicated in Fig. 1. A group of hook members 12, in the present instance being shown as four in number, and arranged in pairs, are disposed about the inside of a tubular chamber 13 provided at one end of the socket member 11. These hook members are preferably composed of the same material as the members 8 and 9, and may be of the same size. The hook members 12 are brazed together in the tubular chamber 13 at one of their extremities, while their other extremities extend outwardly from said chamber. The arms of the hook members 12 are bent outwardly at an angle of approximately thirty degrees, and each arm terminates in a prong or finger 14, the ends of which may be somewhat pointed. The portions 14 are bent back on the arms 12, so that their ends point inwardly towards the socket member, and the pairs of hook members lie in a plane at substantially right angles to each other. The end of the socket member 11 has a threaded portion 15 which is adapted to engage a threaded end of a terminating duct rod which is associated with the line of such rods joined together.

As previously outlined, the loop portion and hook portion of the grappling arrangement are each connected to the end of a line of joined-together duct rods. The end of a duct rod line having the loop portion attached thereto is introduced in the duct of a conduit through one manhole, and the end of a duct rod line having the hook portion attached thereto is introduced in the same duct through an adjacent manhole. Each duct rod line is then pushed through the duct from the separated manholes toward each other until the loop portion and hook portion come to a meeting point in said duct. The meeting of the two portions of the improved grapple, when thus pushed together, cause the prongs of the hooks to spring over the rings of the loop member and become coupled and entangled therewith, and form an interlocked union. The two duct rod lines may be now drawn through the conduit, and the cable introduced therein in a well-understood manner.

From the foregoing, it is thought that the construction, operation and main advantages of the herein-described and delineated invention will be apparent to those skilled in the art, without further description, and it will be understood that various changes in the size, shape, proportion, and minor details of construction, may be resorted to without departing from the spirit, or sacrificing any of the advantages of the invention.

What is claimed is:

1. A grappling arrangement comprising a loop member and a hook member, said loop member having a plurality of arms positioned at right angles with respect to each other, said hook member having corresponding arms, the arms of each member engaging those of the opposite member and coacting with each other when brought together to form an interlocked union.

2. A grappling arrangement comprising a loop member and a hook member, said loop member having a plurality of arms positioned at right angles with respect to each other, said hook member having corresponding arms, the arms of each member engaging those of the opposite member and coacting with each other when brought together to form an interlocked union, and threaded sockets integral with each member.

3. A grappling arrangement comprising two members of resilient material, one of said members having a plurality of loop portions and the other of said members having a plurality of hook portions, the loop portions and hook portions of said members so registering with each other when forced together that they become entangled and form an interlocked union.

4. A grappling arrangement for conduits comprising two members of resilient material, one of said members having a plurality of loop portions and the other of said members having a plurality of hook portions, said hook portions being of such resilience that they spring over the loop portions and become entangled therewith to form an interlocked union between the members when forced together.

5. A grappling arrangement for conduits comprising two members of resilient material, one of said members having a plurality of loop portions and the other of said members having a plurality of hook portions, said hook portions being of such resilience that they spring over the loop portions and become entangled therewith to form an interlocked union between the members when forced together, and a threaded socket integral with each of said members with which a conduit rod is adapted to co-operate.

6. A grappling arrangement for conduits comprising two members of resilient material, one of said members having a plurality of loop portions positioned at right angles with respect to each other, the other of said members having a plurality of hook portions positioned in a corresponding manner, and a threaded socket for each of said members with which a conduit rod is adapted to be attached, said loop portions and hook portions locking with each other in entangled engagement when forced together to permit the withdrawal of the conduit rod in a desired direction.

In testimony whereof, I have signed my name to this specification this 21st day of January, 1926.

JOHN F. DOTZAUER.